UNITED STATES PATENT OFFICE.

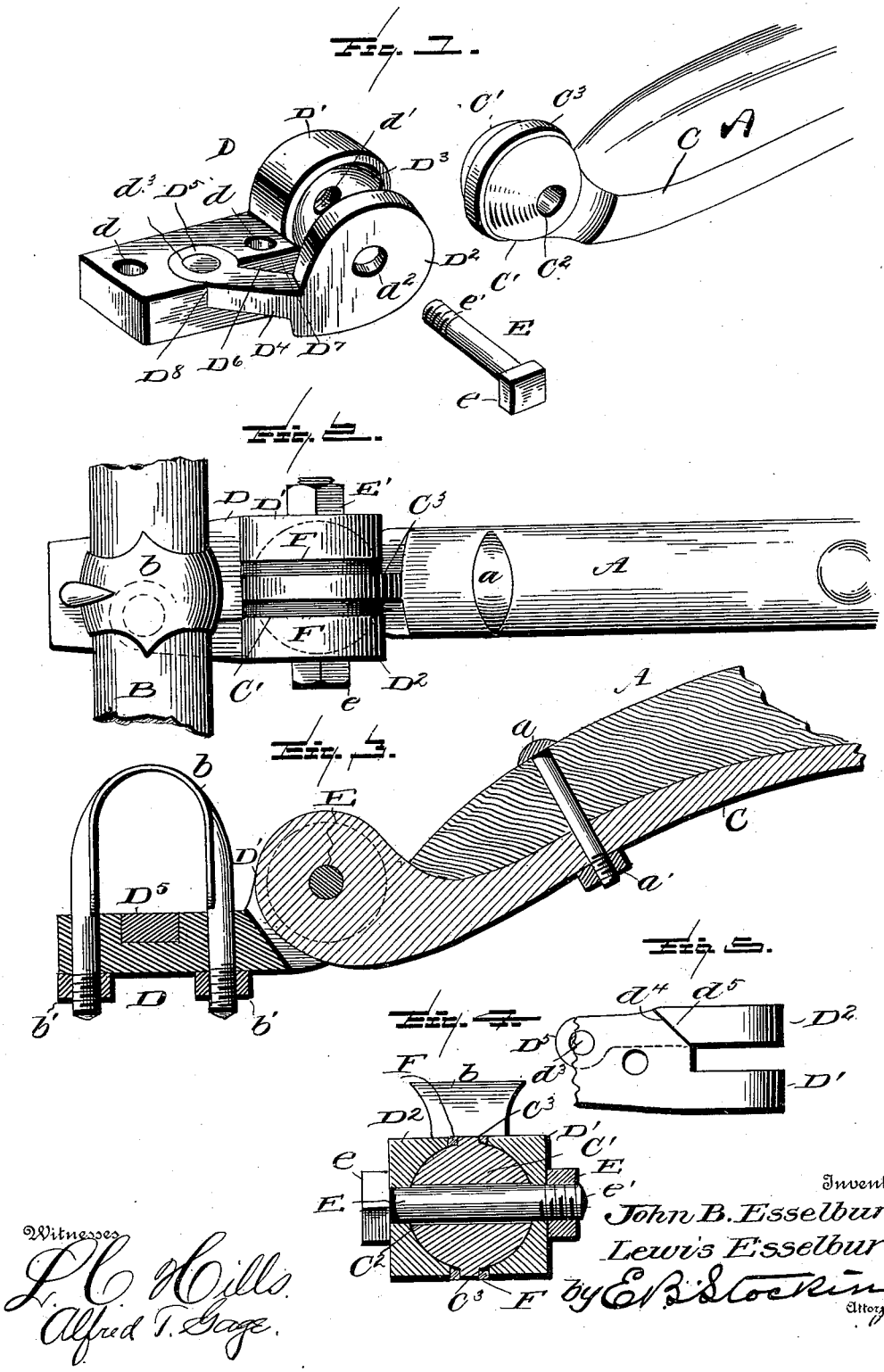

JOHN B. ESSELBURN AND LEWIS ESSELBURN, OF WEST SALEM, OHIO.

THILL-COUPLING.

SPECIFICATION forming part of Letters Patent No. 595,828, dated December 21, 1897.

Application filed May 14, 1897. Serial No. 636,533. (No model.)

*To all whom it may concern:*

Be it known that we, JOHN B. ESSELBURN and LEWIS ESSELBURN, citizens of the United States, residing at West Salem, in the county of Wayne, State of Ohio, have invented certain new and useful Improvements in Thill-Couplings, of which the following is a specification, reference being had therein to the accompanying drawings.

This invention relates to thill-couplings, and more particularly to that class of thill-couplings composed of a ball-and-socket bearing held in contact, so as to support the thill and prevent rattling of the same, while insuring an easy movement thereof in the motions of the horse.

The invention has for its object to improve the construction of the sockets and ball and the means for pivoting the movable member of the sockets and for securing the ball in the sockets.

The invention consists in the novel arrangement, construction, and combination of the parts, hereinafter particularly described, and then pointed out in the appended claim.

In the drawings, Figure 1 is a perspective of the coupling disassembled. Fig. 2 is a top plan of the same with the parts assembled for use. Fig. 3 is a longitudinal vertical section. Fig. 4 is a vertical cross-section through the ball and sockets, and Fig. 5 is a detail bottom plan.

Like letters refer to like parts in the several figures of the drawings.

The letter A designates a thill of ordinary construction which is attached to a stationary portion of the vehicle—for instance, to the axle B. The thill A has attached to its lower portion a ball member C by any suitable means—as, for instance, the bolt $a$ and securing-nut $a'$. The ball proper, C', is formed integral with the shank, which is secured to the thill and is provided with an aperture $C^2$ through the center of the ball portion. Upon the periphery of the ball portion C' a rib or flange $C^3$ is formed for the purposes hereinafter described. The socket member of the coupling is formed of a plate D, which is secured to the axle B or other stationary part by means of a clip passing over the axle and through the bolt-holes $d$ in the plate and is secured in position by means of the bolts $b'$. The plate D is provided with an extension D', having formed therein a socket $D^3$ and a screw-threaded aperture $d'$, extending therethrough. The movable or swinging member $D^2$ of the socket-clamp is provided with a similar socket $D^3$ and an unthreaded aperture $d^2$. The movable member is provided with a pivoting-arm $D^4$, having at its end an annular head portion $D^5$, through which a pivoting-bolt $d^3$ is passed to pivot the member to the stationary member of the socket. The pivoting-recess in the stationary member is provided with an opening of less diameter than the recess, and the head $D^5$ is of greater diameter than this opening, so that the head will be retained in the recess by engagement with the walls thereof, as clearly shown in Fig. 1. The stationary socket D is cut away, as at $D^6$, to form a seat or recess in which the pivoting-arm $D^4$ of the movable member will rest and seat when the parts are clamped together. This seat portion $D^6$ is formed with a vertical portion $D^7$, against which the member $D^4$ will abut, so as to form a solid and rigid bearing therefor when the parts are clamped. The movable member also engages with a shoulder portion $D^8$ to limit its outwardly-swinging movement. The stationary member is formed with an inclined abutting wall $D^4$ and the movable member with a similar wall $d^5$, which walls when in contact with each other firmly brace together and limit the inward movement of the movable part. The ball and sockets are secured together by means of a pivoting-bolt E, formed with a head $e$ at one end and screw-threaded at its opposite end, as at $e'$. A nut E' is threaded upon the end $e'$ to secure the bolt in position. Annular washers F, of any suitable material, may be placed upon each side of the flange $C^3$ between the socket members to prevent the entrance of dust or dirt to the bearing-surfaces of the ball portion.

The parts of the coupling are secured together by placing the ball member within the sockets when opened and then passing the bolt E through the sockets and tightening the bolt by screwing the same into the stationary socket until the desired friction is obtained to hold the parts together against movement or rattling when they are locked in place by the nut. By pivoting the ball member through its center and through the centers of the sockets all twisting or lateral movement of the thill is avoided and the desired friction between the ball and the sockets can be most advantageously secured, as the line of clamping strain and pressure is in the centers of the ball and sockets. In the event of any unusual movement of the thill which would tend to bend or break the bolt the rib or flange $C^3$ would come in contact with the edge of the socket members and thus assist in preventing a further lateral or twisting movement of the thill. The washers also render the coupling practically dust-proof when clamped against the rib or flange.

By locating the movable or swinging member of the sockets in a recess formed in a stationary member the movable member is retained in position and supported by the stationary member and in its inward movement abuts against the rigid part, so as to provide a stop to support and brace the movable member against any strain which would tend to injure or detach the same from the stationary member. The inclined abutting walls formed upon the movable and stationary members of the sockets also form a positive stop and brace for the parts when clamped together.

It is obvious that changes may be made in the details of the construction and shape of the several parts without departing from the spirit of the invention as defined by the claim.

What we claim, and desire to secure by Letters Patent of the United States, is—

A thill-coupling comprising a securing-clip $b$ and a stationary socket-plate D provided with clip-apertures $d$, a circular pivoting-recess having an opening of less diameter than the recess between said apertures, a supporting-seat $D^6$ within the body of the plate and having a vertical wall $D^7$ and a shoulder $D^8$ and a horizontal supporting portion provided with an inclined front wall $d^4$, of a movable socket member $D^2$ provided with a pivoting-arm $D^4$, head portion $D^5$ located in the pivoting-recess of the stationary socket-plate flush with the surface thereof to contact with an axle and with an inclined wall $d^5$ upon the lower portion of the socket member, a ball member having a peripheral flange and provided with a central aperture and located between said sockets, and a clamping-bolt passing through said socket and ball members, substantially as specified.

In testimony whereof we affix our signatures in presence of two witnesses.

JOHN B. ESSELBURN.
LEWIS ESSELBURN.

Witnesses:
SAMUEL A. BAKER,
JOHN DOUBLE.